UNITED STATES PATENT OFFICE.

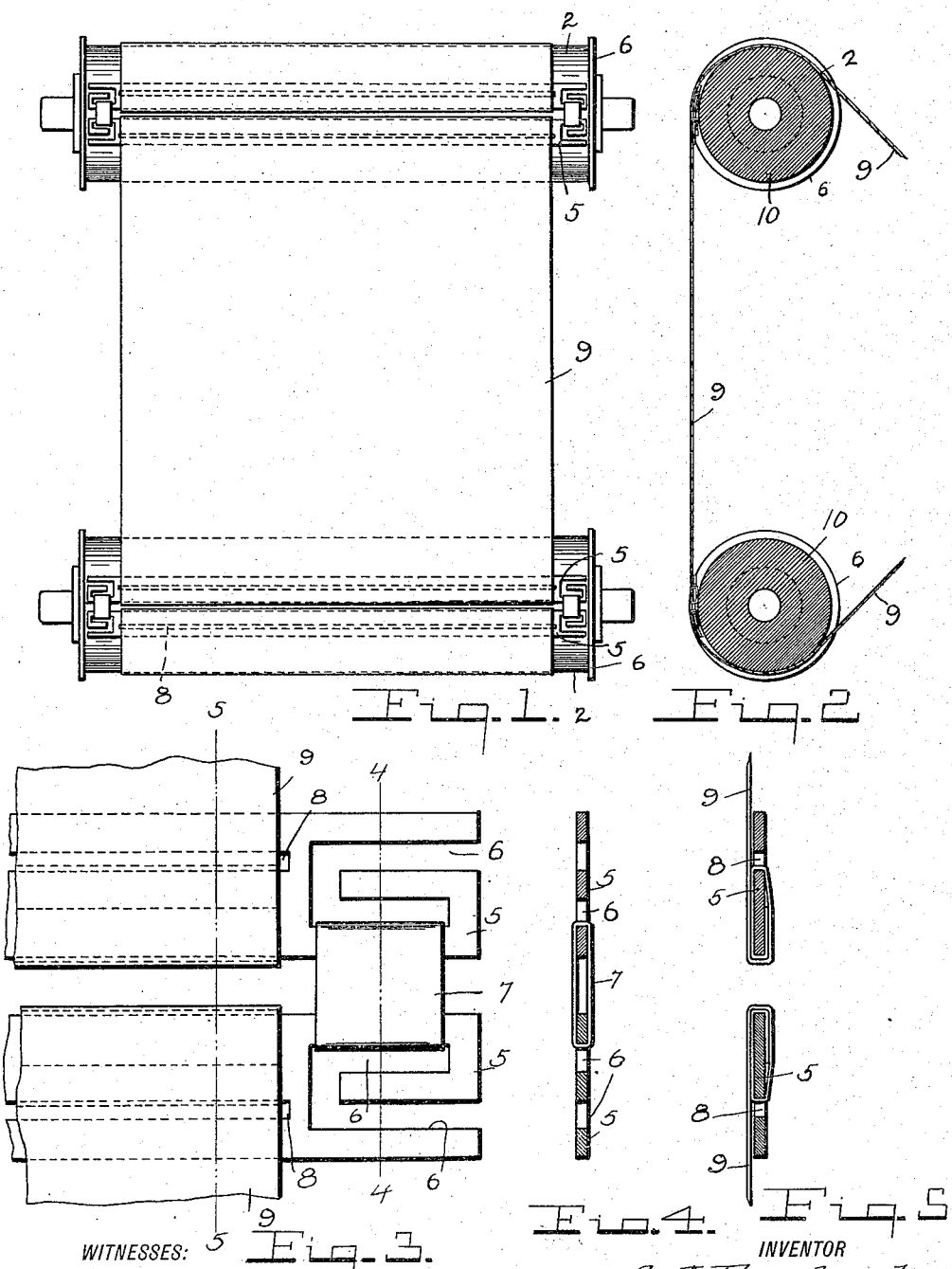

ALFRED J. FAIRBANKS, OF SAN FRANCISCO, CALIFORNIA.

SIGN-HOLDER.

1,166,976.  Specification of Letters Patent.  Patented Jan. 4, 1916.

Application filed November 18, 1914. Serial No. 872,805.

*To all whom it may concern:*

Be it known that I, ALFRED J. FAIRBANKS, a citizen of the United States, residing at San Francisco, in the county of San Francisco and State of California, have invented certain new and useful Improvements in Sign-Holders; and I do hereby declare the following to be a full, clear, and exact description of the invention, such as will enable others skilled in the art to which it appertains to make and use the same.

This invention has for its object to provide novel and efficient devices for reliably and detachably securing a plurality of signs or the like in a strip, whereby the same may be attached to rollers or other suitable devices to cause the several signs comprising the strip to successively travel before a desired place for advertising and display purposes.

With this and other objects in view, the invention consists in the novel construction, arrangement and formation of parts as will be hereinafter specifically described, claimed and illustrated in the accompanying drawing, in which:

Figure 1 represents a front elevation of the invention applied to use. Fig. 2 represents a sectional view on the line 2—2 of Fig. 1. Fig. 3 represents an enlarged fragmental view, partly broken away, of a pair of the holders or attaching devices applied to use. Fig. 4 represents a transverse sectional view on the line 4—4 of Fig. 3, and Fig. 5 represents a transverse sectional view on the line 5—5 of Fig. 3.

Referring to the drawing in detail, the numerals 5 indicate generally the attaching devices or holders which are arranged in pairs and are formed at their opposite extremities with angular slots 6. The members 5 are preferably formed of a flexible material and the members of each pair are detachably and flexibly connected by flexible and elastic endless bands 7 arranged in the slots 6 in the opposite extremities of said members. Each member 5 is further provided with a longitudinally elongated opening 8.

In use, the signs 9 are formed of a width equal to or less than the length of the openings 8 and are engaged at their opposite ends over adjacent members 5 of an adjacent pair of said members. The extreme ends of the strips are positioned through the openings 8 and are securely held under the end portions thereof. If desired, a plurality of openings 8 may be formed in each member 5 and the end portions of the sections or signs 9 may be threaded in and out of the openings to more positively secure the same in operative position. A strip of any desired length may be constructed by attaching any desired number of the signs or sections 9 together, and it is clearly evident that the latter are reliably held in this arrangement by the several members 5.

This type of holder or fastener is particularly adapted for securing a plurality of signs together when it is desired to cause the strip to travel over the guides 10 and to be wound upon rollers (not shown), as it is evident that the flexible members 5 and flexible connections or straps 7 will readily conform to the shape of the guide or roller over which or upon which the strip is to be wound.

What I claim is:

1. In a device of the character described a strip composed of a plurality of sections, means for attaching said sections together including flexible members arranged in pairs and having longitudinally elongated openings securing the ends of the sections, and endless flexible and elastic connections between the outer ends of each pair of members.

2. In a device of the character described a strip composed of a plurality of sections, means for securing the sections together including a plurality of flexible members arranged in pairs and having longitudinally elongated openings receiving the ends of the sections and having angular slots in the ends thereof, and elastic endless connections engaged within said slots and securing the members of each pair together.

In testimony whereof I affix my signature in presence of two witnesses.

ALFRED J. FAIRBANKS.

Witnesses:
E. B. WALLEY,
D. J. WATSON.

Copies of this patent may be obtained for five cents each, by addressing the "Commissioner of Patents, Washington, D. C."